Sept. 15, 1970     G. T. MILLER ET AL     3,528,859
ELECTRODE STRUCTURE FOR WICKING TYPE FUEL CELL
Filed Oct. 5, 1967     3 Sheets-Sheet 1

United States Patent Office 3,528,859
Patented Sept. 15, 1970

3,528,859
ELECTRODE STRUCTURE FOR WICKING TYPE FUEL CELL
George T. Miller, Lewiston, N.Y., and Arabinda N. Dey, Needham, Mass., assignors to Hooker Chemical Corporation, Niagara Falls, N.Y., a corporation of New York
Filed Oct. 5, 1967, Ser. No. 673,105
Int. Cl. H01m 27/04
U.S. Cl. 136—86               4 Claims

ABSTRACT OF THE DISCLOSURE

Fuel cells equipped with electrodes which operate with liquid fuels substantially insoluble in the electrolyte via a wicking action to contact the fuel, electrolyte and catalyst disposed on the electrode are provided. The selective adsorption or wetting of the electrode surface is effected through the preferential wetting by a liquid fuel of a hydrophobic porous substance placed upon an electrically conductive base or support. This preferential wetting action produces a wicking effect in or on the electrode which results in the continuous wetting of active sites. Fuel cells operating with these electrodes are more efficient than fuel cells operating with conventional porous electrodes.

BACKGROUND OF THE INVENTION

Fuel cells have become known in the art as systems or apparatuses wherein chemical energy resulting from the oxidation of materials such as hydrogen, carbon monoxide, alcohols, hydrocarbons or the like is electrochemically converted to electrical energy at an inert electrode. Preferably, such cells are adapted for continuous operation wherein a fuel and an oxidizer as continuously fed into the cell, the oxidizer being fed to one electrode and the fuel to another. Preferred oxidizers are oxygen, or an oxygen-containing gas, such as air. When the oxidizable material is a gas, such as hydrogen or a low molecular weight hydrocarbon, it is fed into the cell by way of a porous electrode, through which the gaseous material passes into contact with the electrolyte. The fuel electrode commonly is provided with a catalytic material such as platinum on the surface of the electrode and exposed to the electrolyte, whereby the fuel gas fed into the porous electrode comes into contact with both the electrolyte and the catalytic material.

Heretofore, the fuels utilized in fuel cells have been chiefly hydrogen, gaseous hydrocarbons or other carbonaceous gases or water-soluble materials, such as methyl and ethyl alcohols. The use of gaseous fuel requires the employment of porous electrodes which have a number of disadvantages. In addition, for many uses of fuel cells portable small cells are desired which can readily be transported to locations where electric energy is not readily available. For such purposes, a fuel which can be readily stored and handled and is readily available at such locations is highly desired; and the liquid hydrocarbon fuels are optimum for these requirements. Thus, any expedition, proceeding to localities where electric energy is not available would generally carry liquid hydrocarbon fuel for their means of transportation and this same fuel, by the employment of my invention, could be used for operating the fuel cells.

In operating a fuel cell with a porous fuel electrode, care must be taken to prevent flooding of the sites of catalytic activity by the electrolyte, thus preventing contact between the fuel and catalyst. When the fuel is liquid there is the added tendency for catalyst sites to be flooded by the liquid fuel. A further difficulty is caused by the tendency of liquid hydrocarbons to plug the pores by deposition of polymerization products. A fuel cell having a layer of liquid hydrocarbon fuel floating on the electrolyte with the electrode extending up into the fuel layer has been proposed, but in this method the electrode surface utilized is confined substantially to the interface of the two liquids or to a very short distance therefrom, complicating the design of a cell having adequate capacity.

SUMMARY OF THE INVENTION

An object of the present invention is the production of electric energy by means of a fuel cell utilizing a liquid fuel. A further object is to provide an improved means for bringing the liquid fuel into contact with the electrolyte and reactive sites on the electrodes. Another object is to bring the liquid fuel into contact with the electrolyte and catalyst over an extended area of the electrode, penetrating deeply into the electrolyte. Still other objects will be apparent from the following description of the invention.

In accordance with this invention we provide a fuel cell having an oxidizable liquid material as fuel and cause the liquid fuel to contact in a thin layer or film, the surface of an electrically conductive, solid electrode which is provided with small projections which are composed of, or coated with, suitable catalytic material. Preferably these catalytic projections are produced by abrading the surface of the electrode material, and the projections thus produced are coated with a suitable catalytic material such as platinum or a noble metal. In one modification utilizing liquid hydrocarbon as fuel, the fuel may be applied at a lower portion of the electrode which is immersed in the electrolyte so that it travels upwardly in a thin layer over the surface of the electrode. The catalytic projections project, through the layer of the liquid hydrocarbon into the electrolyte, so that the hydrocarbon contacts both the catalytic sites and the electrolyte. The electrode is so constructed that it will expose a porous, hydrophobic surface to the liquid, substantially water-immiscible, carbonaceous fuel. The fuel preferentially wets or absorbs to the surface of the porous, hydrophobic surface effecting continuous wetting of the electrode and contact of the fuel, electrolyte and catalyst deposited on the sharp, pointed, apex or edges of the elevated areas on the electrode.

In this manner, liquid fuel may be disposed above or below the electrolyte surrounding the fuel electrode which extends into both of the substantially immiscible or immiscible layers. Liquid fuel above the electrolyte will be carried down the electrodes of this invention by capillary action or by preferential wetting of the electrode. Conversely, a liquid fuel below the electrolyte will be carried upward by the same action. Liquid fuel may also be pumped to the bottom of the electrodes of this invention and be allowed to rise to the surface of the electrolyte via preferential wetting or capillary action.

Our electrodes are basically constructed from a suitable electroconductive base or support material with a hydrophobic, porous material applied to its surface in continuous manner along the vertical axis. The catalyst may be applied to the surface of the electroconductive base, to the surface of the porous, hydrophobic material, or both. Furthermore, the catalyst may be mixed with the porous hydrophobic material in any suitable fashion.

One aspect of the improved electrode involves a modification of copending application S.N. 622,959 of G. T. Miller, filed Mar. 4, 1967 which in turn is an improvement upon the electrode disclosed in U.S. 3,361,656 to G. T. Miller. We discovered that if the longitudinal grooves in the electrode disclosed and claimed in said copending application are filled with (1) platinum black, or (2) carbon or platinized carbon or platinum black and a porous, hydrophobic polymeric material such as a polyolefin (i.e. polyethylene, polypropylene, polybutylene, etc.) which was polymerized in the presence of a salt and from which the salt was leached away to form a porous material; a polyvinylchloride prepared in the same manner; or a polymer of a perfluoroolefin, such as tetrafluoroethylene which is hydrophobic and of sufficient porosity, an excellent wicking action is produced with an organic liquid fuel.

A second aspect of this invention resides in an electrode comprising a platinum gauze electroconducting support or a conducting metallic screen support upon which a composition of catalyst and hydrophobic porous polymeric material has been placed. Specifically, a mixture of platinum black and polyperfluoroethylene distributed over the surface of the gauze or screen and subsequently sintered, provides a unique wicking electrode for fuel cells. Likewise, any of the catalyst-hydrophobic polymer combinations referred to in the preceding paragraph may be placed upon a metallic screen or platinum gauze electroconducting support to provide, after sintering, an excellent wicking action for a fuel electrode.

A flash of catalyst such as platinum may be placed upon the surface of any of the above mentioned electrodes after their preparation to provide additional catalytic sites over the surface of the electrode. However, such treatment is optional and generally advantageous only where the originally constructed electrode did not contain a catalyst incorporated into the porous areas or contained an insufficient number of catalytic sites on the surface of the supporting electrode base.

DESCRIPTION OF PREFERRED EMBODIMENTS

Figure 1:
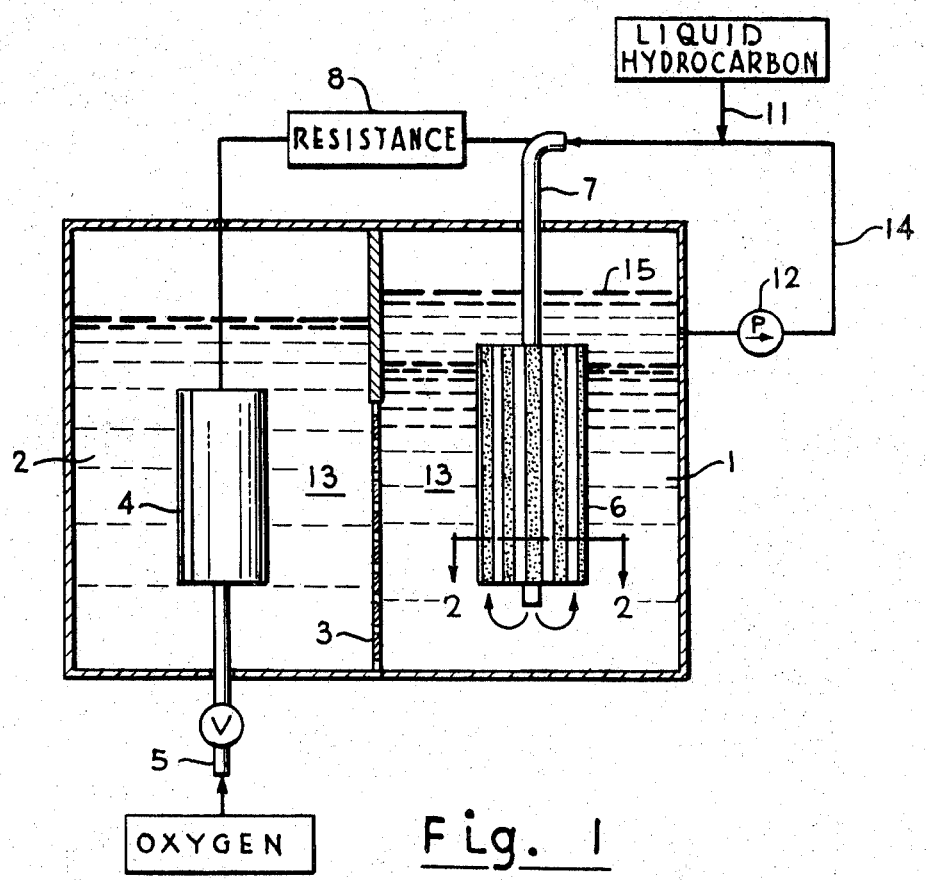
FIG. 1 is a diagrammatic illustration of a fuel cell which embodies the present invention.
Figure 2:
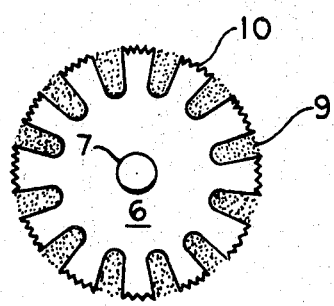
FIG. 2 is a cross-sectional view of one of the fuel electrodes of the invention.

The fuel cell illustrated by FIG. 1 is provided with fuel electrode compartment 1 and oxidizer electrode compartment 2 which are separated by porous diaphragm 3. Compartment 2 is provided with a conventional oxidizer electrode 4 made of porous carbon and fed with oxygen or air through inlet pipe 5. Compartment 1 is provided with fuel electrode 6 which may be made of an electroconductive material containing exposed porous, hydrophobic surfaces with a catalyst deposited on the lands, within the porous hydrophobic material and/or on the surface of the entire electrode. The fuel electrode 6 is provided with a pipe 7, passing through the length of the electrode. Pipe 7 may also function as the lead for connecting the electrode to resistance 8 to which electrode 4 is electrically connected. If preferred, a separate electrical connection may be made to the electrode. Resistance 8, of course, represents any means for utilizing the electrical power generated by the cell whether by transference into heat, mechanical motion or other forms of energy. Pipes 11 and 14 and associated pump 12 serve to flow liquid fuel into pipe 7. Electrode 6 has a plurality of grooves 9 on its surface which are filled with platinum black, or carbon, platinized carbon or platinum black with colloidal porous, hydrophobic polymeric material. The lands 10 between the filled grooves have been abraded to form small projections thereon as shown in FIG. 2. These projections are activated with a catalytic material such as platinum by electroplating or other conventional methods.

In operation, the cell is charged with a conventional liquid electrolyte 13, for example, a solution of sulfuric or phosphoric acid. Air or oxygen is fed to electrode 4 by means of pipe 5, a liquid hydrocarbon is fed to the cell by way of pipe 11 and is circulated by pump 12 through pipes 14 and 7, from whence it passes into the filled grooves 9 of the fuel electrode and wicks upwardly therethrough, forming a hydrocarbon layer 15 floating on the surface of the electrolyte. As the hydrocarbon passes up through the filled grooves 9 of the electrode it comes into contact with the catalytic projections on the lands between the grooves, substantially over the entire surface of the electrode immersed in the aqueous electrolyte. By proper adjustment of the rate of flow of the liquid hydrocarbon through pipe 7 any flooding of the reactive sites on the electrode is easily avoided, while at the same time continuous contact of the hydrocarbon with the catalytic material is readily maintained over substantially the entire surface of the electrode immersed in the liquid aqueous electrolyte.

In another method of practicing the invention the flow of electrolyte through pipe 7 may be dispensed with, in which case a wicking or capillary action of the filled grooves in the electrode causes the electrolyte to flow, in opposition to the force of gravity, downwardly into the heavier aqueous electrolyte to a substantial distance below the inter layer of hydrocarbon floating on the surface of aqueous electrolyte. For example, it is thus possible to carry the hydrocarbon below the surface to a considerable distance and thence bring it into contact with the electrolytic material on the exterior surface of the electrode. The distance to which the fuel travels downwardly in the filled grooves depends on the width of the grooves, the nature of the fill, and the respective natures of the fuel and the electrolyte. In this modification, pump 12 may be eliminated, and a suitable layer of liquid hydrocarbon floating on the surface of the aqueous electrolyte may be maintained by feed through pipes 11 and 14, for example, a layer 0.5 to 50 centimeters deep.

Figure 3:
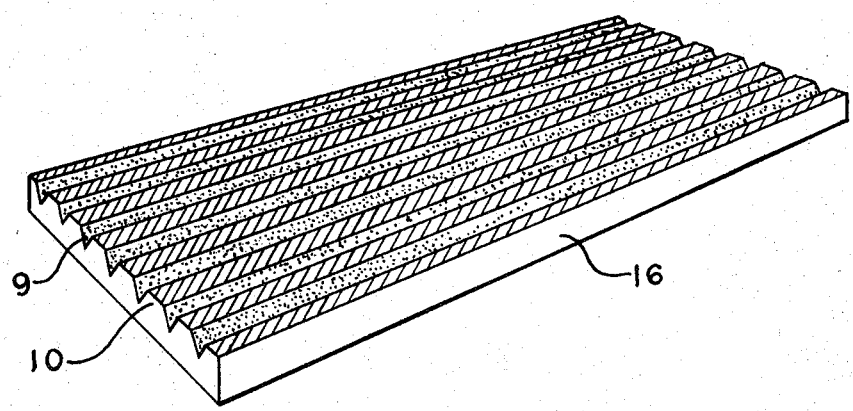
FIG. 3 is a view of a second fuel electrode of the invention.

In place of the cylindrical electrode shown in FIGS. 1 and 2, my invention may be practiced with a flat or plane fuel electrode. An example of such plane electrode is shown in FIG. 3, which diagrammatically represents a portion of the electrode surface 16 having the vertical grooves 9 with plateaus or lands 10 between the grooves. The grooves 9 are filled with the porous, hydrophobic polymeric material.

Figure 4:
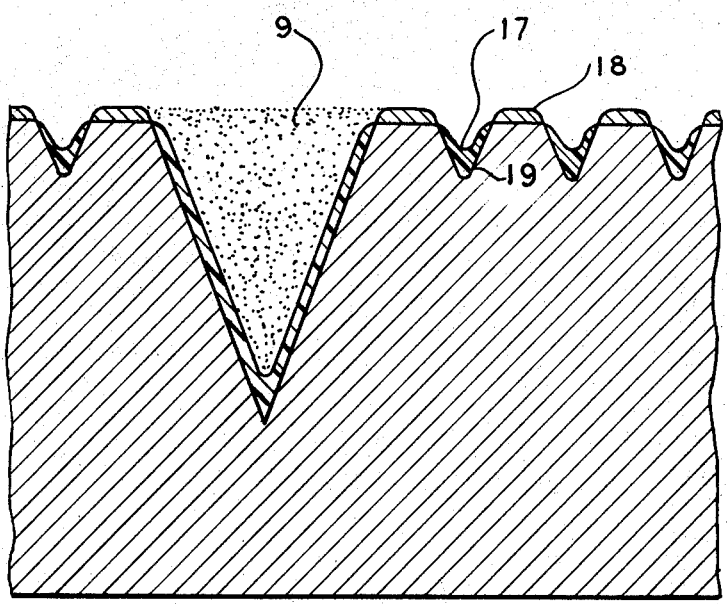
FIG. 4 is a magnified cross-sectional view of an electrode construction according to FIG. 3.

FIG. 4 is a cross-sectional view of a portion of one modification of an electrode surface according to FIG. 3. In this modification, after the grooves are formed in the sheet of electroconductive material 16 which may be for example graphite or a suitable metal, the lands between the grooves are provided with a series of small grooves or scratches 17 at an angle to the grooves 9. A fill of polymeric material is placed in grooves 9, leaving the upper surfaces of the lands 10 bare. On the upper surfaces then is placed a catalytic material such as platinum 18. The grooves 9 and scratches 17 therein in the lands may be formed by a variety of methods well known in the art of metal fabrication, the best mode often depending upon the material used as the electrode substrate. The grooves may be formed by molding, extrusion or by cutting with a tool on a milling machine, for example. The same or similar methods may be used for making the traverse scratches 17 in the lands. One satisfactory method is to merely abrade the lands with an abrasive material such as paper or cloth coated with abrasive grains of suitable coarseness. Another method is to mill with a saw blade that has substantially no set, or negative set, so as to throw up high burrs. When forming these scratches with sharp tools or abrasive, sharp ridges, protuberances or burrs usually are thrown up on the edge of the scratch, particularly when the substrate is a metal. The abrasion forming scratches 17 throws up ridges 19 on either side of each scratch.

Figure 5:
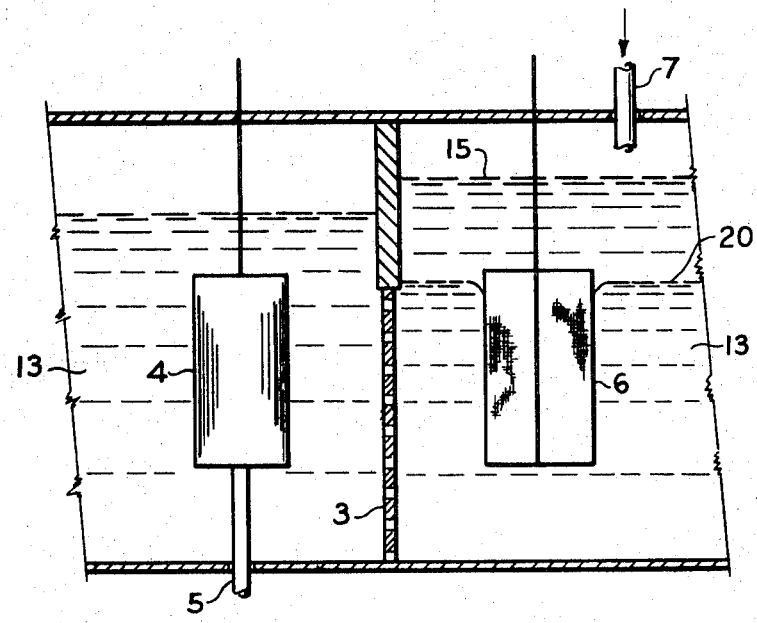
FIG. 5 is a diagrammatic illustration of a fuel cell system embodying the gauze or screen support concept of this invention.
Figure 6:
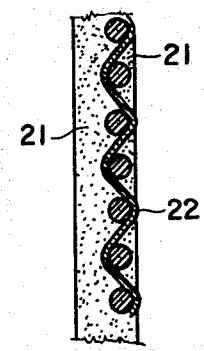
FIG. 6 illustrates a magnified cross-sectional view of the screen or gauze supported fuel electrode shown in FIG. 5.

In place of the fuel electrodes shown in FIGS. 1–4, my invention may be practiced with a screen or gauze supported electrode. An example of the type of electrode is presented in FIGS. 5 and 6. In operation, the fuel cell unit of FIG. 5 is the same as that discussed in conjunction with FIG. 1. In essence, the compartment housing the oxidizer electrode 4 is separated by permeable membrane 3 from the compartment housing the fuel cell compartment 6. An electrolyte 13 is contained in each compartment. The oxidizer electrode is connected via means 5 to an oxidant and fuel 15 is introduced into the fuel electrode compartment via means 7. An interface 20 forms between the fuel and electrolyte, preferentially wetting the porous, hydrophobic material 21 supported on the screen or gauze 22 of the fuel electrode in FIG. 5, this preferential wetting is depicted by the curvature of interface 20 as it contacts the electrode.

The fuel electrodes of this invention may be made of any solid electro-conductive material for example, graphite, carbon, or any metal which is compatible with the electrolyte employed, for example, steel, brass, copper, lead, tin and various alloys of these metals. If desired, organic plastic materials which have been rendered electroconductive by coatings of metal or other conductors or by impregnation with conductive metal or carbon powders may be used. While I generally prefer to use a non-porous material for the electrode, the presence of porosity in the electrode is not in itself detrimental, and hence porous as well as non-porous materials may be used, if desired. Catalytic material preferably is placed only on elevated points or ridges extending above the main electrode surface, for example on the ridges or burrs 19 shown in FIG. 4. This affords the most efficient usage of catalyst material and markedly decreases the cost of the fuel cell when the catalyst material, such as platinum, is expensive.

The function of the diaphragm in a fuel cell is to prevent the fuel from contacting the oxidizing electrode and to keep the oxidizing material from the fuel electrode. Any of the conventional devices serving this function may be employed, whether semipermeable diaphragms or merely partitions or submerged wiers.

Example 1

A fuel cell was constructed having a glass shell defining two electrode compartments separated by a fritted glass diaphragm. The oxidizer electode consisted of a cylinder of platinum screen and oxygen was introduced below the electrode. The fuel electrode in the other compartment was of graphite, cylindrical, with a copper tube fitted into an axial hole extending through the electrode, substantially as shown in FIGS. 1 and 2 of the appended drawings. There were eleven grooves parallel to the axis about 1 mm. deep and about 0.6 mm. wide. These grooves were filled with a paste of active carbon and polystyrene in benzene. The electrode was dried and platinized electrochemically from a chloroplatinic acid solution. The method disclosed by J. H. Ellis, J. Am. Chem. Soc. 38, 737 (1916) may be used to platinize the electrode. The surface area of the electrode was about 25 square centimeters.

Both compartments of the cell were charged with 10% aqueous phosphoric acid. A layer of octane about 2 cm. deep was placed in the fuel electrode compartment, floating on the aqueous electrolyte. The graphite electrode was placed with vertical axis so that it was partly in the octane layer and partly in the aqueous electrolyte.

A pump was arranged to take octane from the octane layer and force it down through the axial hole of the graphite electrode.

Maintaining a cell temperature of about 100 degrees centigrade and pumping the octane downward so that it contacted the porous, hydrophobic material in the grooves of the graphite electrode support.

The following data was obtained:

FUEL CELL CONDITION

Open circuit potential difference=0.67 volt

| Current, milliamperes: | Volts |
|---|---|
| 0.1 | 0.64 |
| 0.3 | 0.60 |
| 1.0 | 0.49 |
| 2.0 | 0.39 |
| 3.0 | 0.30 |
| 6.0 | 0.15 |
| 10.0 | 0.02 |

A comparative example was performed as follows:

Example 2

A porous carbon electrode was prepared with vertical grooves cut in its longitudinal axis substantially the same as that provided in Example 1. The electrode was platinized to a uniform smooth black color on the originally grayish black carbon surface. The electrode was installed in the cell described in Example 1, provided with 10% phosphoric acid electrolyte and fed with octane as fuel at a temperature about 100 degrees centigrade. This electrode has a surface area of 47 square centimeters.

The following data was obtained:

FUEL CELL CONDITION

Open circuit potential difference=0.58 volt

| Current, milliamperes: | Volts |
|---|---|
| 1 | 0.45 |
| 3 | 0.30 |
| 6 | 0.15 |

From this comparison it may be seen that the fuel cell operating in Example 1 is unexpectedly superior to that of Example 2. For example, at 3 ma. current, the cell of Example 1 generated 0.12 ma./cm.$^2$ at 0.30 volt, whereas the cell of Example 2, operating on a fuel electrode in which the vertical grooves have not been filled with hydrophobic porous material, generates at 3 ma. current, 0.064 ma./cm.$^2$ at 0.30 volt. Likewise at 6 ma. current, the cell of Example 1 generates 0.13 ma./cm.$^2$ at 0.15 volt whereas the cell of Example 2 generates 0.25 ma./cm.$^2$ at 0.15 volt.

Example 3

An additional fuel electrode which constitutes an aspect of our invention may be prepared by spreading a mixture of 0.5 gram platinum black, 0.05 cc. colloidal polyperfluoroethylene (Teflon) and 2 cc. water on a sheet of aluminum foil. The aluminum foil is then heated for 5 minutes at 150 degrees centigrade. A piece of platinum gauze (2 cm.$^2$) was placed between two sheets of aluminum foil coated with the platinum black polyperfluoroethylene mixture. The electrode was then placed between a few layers of brown paper and placed in a press. The press was heated to approximately 150 degrees centigrade for five minutes. The wrapping paper and aluminum foil were then removed, leaving the porous hydrophobic material containing platinum black deposited on the platinum gauze.

The performance of this electrode in the fuel cell described in Example 1 with 10% phosphoric acid, octane fuel at about 100 degrees centigrade with one square centimeter of the electrode exposed to the octane fuel provides an excellent wicking effect.

FUEL CELL CONDITION

Open circuit potential difference=0.95 volt.
Rest potential (sat. calomel electrode) of fuel electrode=−0.08 volt (decreasing).

Rest potential (sat. calomel electrode) of oxidizer electrode=0.75 volt (increasing).

| Current, milliamperes: | Volts |
|---|---|
| 0.1 | 0.95 |
| 0.3 | 0.94 |
| 1.0 | 0.90 |
| 3.0 | 0.80 |
| 6.0 | 0.60 |
| 10.0 | [1] 0.45 |

[1] Decreasing to 0.40.

With time the voltage decreases. After one hour the open circuit voltage decreases to 0.81 volt. At that point, the following data was obtained:

| Current, milliamperes: | Volts |
|---|---|
| 10 | [1] 0.4 |

[1] Slowly decreasing to 0.25.

Rest potential of $O_2$ electrode vs. saturated calomel electrode=0.83 volt.
Rest potential of fuel electrode vs. saturated calomel electrode=0.05 volt.
Potential of $O_2$ electrode (vs. S.C.E.) when 4 ma. current is drawn=0.67 volt.
Potential of fuel electrode (vs. S.C.E.) when 4 ma. current is drawn=0.15 volt.

Example 4

Another fuel electrode was prepared by soaking platinum gauze in doubly diluted colloidal polyperfluoroethylene (Teflon; as supplied by the E. I. du Pont de Nemours Chemical Co., Wilmington, Del.) and dipping the wet gauze into platinum black and drying the electrode. The platinum black forms a thin coat over the gauze, the latter providing a very good support. The procedure of soaking, dipping and drying may be repeated several times if a thicker layer of platinum black polyperfluoroethylene is desired.

This fuel electrode was placed in a glass fuel cell as described in Example 1 with 20% $H_3PO_4$, octane fuel, exposing 0.5 cm.² of the electrode and the cell was operated at about 100 degrees centigrade with the following results.

FUEL CELL CONDITION

Open circuit potential difference=0.89 volt dropping to 0.86 volt

| Current, milliamperes: | Volts |
|---|---|
| 1 | 0.70 |
| 3 | 0.59 |
| 5 | 0.53 |
| 6 | [1] 0.48 |

[1] Dropping gradually.

Example 5

Example 4 was repeated with the sole distinction that a 10% by volume solution of $H_3PO_4$ was used as the electrolyte.

FUEL CELL CONDITION

Open circuit potential difference=0.86 volt
Rest potential of $O_2$ electrode (v. S.C.E.)=0.85 volt.
Rest potential of fuel electrode (v. S.C.E.)=0.01 volt

| Current, milliamperes: | Volts |
|---|---|
| 1 | 0.65 |
| 3 | [1] 0.56 |

[1] Periodic fluctuations that decrease with time.

While an important object of this invention is to provide a means for utilizing liquid hydrocarbons as fuels in fuel cells, the invention is not restricted thereto and it is applicable to employment of any liquid fuel in a fuel cell. Practically any organic liquid may be utilized, except that liquids such as lower molecular weight alcohols which are readily soluble in the electrolyte are not within the scope of this invention, because they react from solution, whereas my invention comprises reacting a film of liquid fuel on the surface of the electrode in contact with the electrolyte as a separate phase. However, the presence of oxidizable material soluble in the electrolyte in the fuel compartment is not deleterious to the practice of my invention and therefore is included. In addition to liquid hydrocarbons, whether aliphatic or aromatic, I may use nitriles, esters, high molecular weight alcohols and ketones, azo compounds, liquid aromatic acids and other carboxylic compounds. Solutions of solid carbon-containing compounds, such as high molecular weight fatty acids, naphthalene and the like may be utilized by dissolving them in liquid hydrocarbons or other liquid fuel and feeding the solutions to my improved electrode. Likewise, gaseous hydrocarbons or other oxidizable gases dissolved in liquid hydrocarbon may be employed as the liquid fuel. The solvents thus used need not function as fuels, but they may be only partly or substantially completely resistant to oxidation in the fuel cell and function mainly to transport the oxidizable material to the sites of reaction. Solvents thus resistant to oxidation include silicone oils and various halogenated hydrocarbons such as carbon tetrachloride, chloroethylenes and the fluoroethylenes. One function of such solvent is to modify the specific gravity of the fuel stream; for example, the solution may be made heavier than the aqueous electrolyte. It is to be understood that the term "liquid fuel" includes all fuel materials which are liquid at the temperature of the electrolyte in contact with the fuel electrode.

The invention further is not restricted to carbonaceous liquid fuels but any oxidizable liquid material for example, molten phosphorus or molten sulfur, may be used. Thus, in the employment of molten phosphorus, utilizing phosphoric acid as the electrolyte, the phosphorus is oxidized to form phosphoric acid while simultaneously producing an electric current, thereby decreasing the cost of production of the oxidation product. Similarly, sulfur may be converted to sulfurous and sulfuric acids and simultaneous production of electric current.

My invention is adapted for use in any fuel cell whereby a liquid material is electrochemically reacted to produce electric energy. Fuel cells are well known, employing a variety of materials as reactants. In most cases, oxidation-reduction reactions are utilized, oxygen or other oxidizer being fed to one electrode and an oxidizable material to the other. The most common oxidizing electrode is a porous electrode made of carbon or other electro-conductive material to which is fed oxygen or air. However, our invention which comprises a means for utilizing liquid material as fuel in an oxidizing fuel cell, is not concerned with the nature of the oxidizing electrode or of the oxidizing material, but may utilize any conventional oxidizing electrode. While oxidizing agents for this purpose which have been proposed include solutions of peroxides or other active oxygen-producing compounds or materials such as halogens, particularly chlorine and bromine, I generally prefer to use an oxygen-containing gas, such as air, which is generally available.

It is to be understood that this invention is not to be limited to the specific examples given above, but is to embrace all obvious equivalents thereof. The invention is only limited by the appended claims.

What is claimed is:
1. In an electrode having an electrically conductive surface comprising a plurality of longitudinal grooves and lands defined by said grooves on the electrically conductive surface, said lands having thereon, at an acute angle to said longitudinal grooves, a multiplicity of grooves which define a multiplicity of projections, the improvement which comprises filling said grooves with a material selected from the group consisting of platinum black and a porous, hydrophobic polymeric material containing dispersed therein platinum black, platinized carbon or carbon, said porous, hydrophobic polymeric material being sufficiently porous to effect wicking of the fuel through the hydrophobic polymeric material into contact with the surface of the electrode, said lands and said filled grooves containing surface catalyst sites.

2. The electrode of claim 1 in which said electroconductive surface is graphite.

3. The electrode of claim 1 in which the porous, hydrophobic polymeric material is a member selected from the group consisting of hydrocarbon polyolefins and polyhalo-olefins.

4. A fuel cell comprising in combination a casing divided by a diaphragm into compartments housing respectively an oxidizer electrode and a fuel electrode as defined in claim 1, means for supplying an oxidant to the oxidizer electrode and means for supplying a liquid fuel to the fuel electrode compartment, and electrolyte in each electrode compartment, said electrolyte being substantially immiscible with the liquid fuel.

References Cited

UNITED STATES PATENTS

| | | | |
|---|---|---|---|
| 3,098,772 | 7/1963 | Taschek | 136—86 X |
| 3,188,241 | 6/1965 | Weiss et al. | 136—86 |
| 3,297,484 | 1/1967 | Niedrach | 136—86 |
| 3,403,055 | 9/1968 | Weiss et al. | 136—86 |
| 3,419,900 | 12/1968 | Elmore et al. | 136—86 |
| 3,432,355 | 3/1969 | Niedrach et al. | 136—86 |

ALLEN B. CURTIS, Primary Examiner

U.S. Cl. X.R.

136—121, 120